(12) United States Patent
Lian

(10) Patent No.: US 10,089,861 B2
(45) Date of Patent: Oct. 2, 2018

(54) METHOD AND APPARATUS FOR CONFIGURING WIRELESS REMOTE CONTROL TERMINAL BY THIRD-PARTY TERMINAL

(71) Applicant: Ning Lian, Beijing (CN)

(72) Inventor: Ning Lian, Beijing (CN)

( * ) Notice: Subject to any disclaimer, the term of this patent is extended or adjusted under 35 U.S.C. 154(b) by 0 days.

(21) Appl. No.: 15/812,757

(22) Filed: Nov. 14, 2017

(65) Prior Publication Data
US 2018/0075736 A1    Mar. 15, 2018

Related U.S. Application Data

(63) Continuation-in-part of application No. PCT/CN2015/084016, filed on Jul. 14, 2015.

(30) Foreign Application Priority Data

May 14, 2015 (CN) .......................... 2015 1 0247019

(51) Int. Cl.
*G08C 17/02* (2006.01)
*H04L 29/08* (2006.01)
*G06F 9/445* (2018.01)

(52) U.S. Cl.
CPC ......... *G08C 17/02* (2013.01); *G06F 9/44505* (2013.01); *H04L 29/08* (2013.01); *H04L 67/125* (2013.01); *H04L 67/34* (2013.01); *G06F 9/445* (2013.01); *G08C 2201/21* (2013.01); *G08C 2201/93* (2013.01)

(58) Field of Classification Search
CPC ............... G08C 17/02; G08C 2201/21; G08C 2201/93; H04L 29/08; H04L 67/125; H04L 67/34; G06F 9/445; G06F 9/44505
See application file for complete search history.

(56) References Cited

U.S. PATENT DOCUMENTS

| | | | | |
|---|---|---|---|---|
| 6,020,881 A | * | 2/2000 | Naughton | H04L 12/282 348/E5.102 |
| 6,104,334 A | * | 8/2000 | Allport | H04N 21/8186 340/12.28 |
| 8,014,768 B2 | * | 9/2011 | Ackley | G08C 17/02 340/3.1 |
| 8,150,384 B2 | * | 4/2012 | Abifaker | H04W 4/21 455/418 |

(Continued)

*Primary Examiner* — Babar Sarwar
(74) *Attorney, Agent, or Firm* — Christopher M. Scherer; DeWitt Ross & Stevens S.C.

(57) ABSTRACT

Disclosed are a method and apparatus for configuring a wireless remote control terminal by a third party terminal. The wireless remote control terminal is used for remotely controlling one or more remotely controlled devices. At the third party terminal side, the method comprises: establishing a wireless communication connection with a wireless remote control terminal; generating configuration information about the wireless remote control terminal in response to an operation of a user; and sending the configuration information to the wireless remote control terminal via the wireless communication connection. By means of the present invention, home intelligentization and automatization can be achieved without additionally using a control center, the cost is low, and the control process is simple, thereby facilitating the overall popularization of intelligent home appliances.

9 Claims, 4 Drawing Sheets

(56) References Cited

U.S. PATENT DOCUMENTS

| | | | | |
|---|---|---|---|---|
| 8,650,600 B2* | 2/2014 | Ogle | ............ | H04W 4/21 725/81 |
| 2005/0054337 A1* | 3/2005 | Nobusawa | ........ | H04M 1/72533 455/420 |
| 2005/0192051 A1* | 9/2005 | Tokuhashi | ........ | H04M 1/72533 455/556.1 |
| 2006/0044175 A1* | 3/2006 | Choi | ............ | G08C 17/02 341/173 |
| 2009/0167555 A1* | 7/2009 | Kohanek | ............ | G08C 17/02 340/3.1 |
| 2011/0055772 A1* | 3/2011 | Hatambeiki | ......... | H04N 5/4403 715/863 |
| 2011/0223899 A1* | 9/2011 | Hiraide | ............ | G08C 17/02 455/420 |
| 2011/0287757 A1* | 11/2011 | Nykoluk | ............ | G08C 17/02 455/419 |
| 2012/0210268 A1* | 8/2012 | Hilbrink | ............ | G06F 3/0484 715/773 |
| 2012/0295662 A1* | 11/2012 | Haubrich | ........ | H04M 1/72533 455/556.1 |
| 2014/0150010 A1* | 5/2014 | Jeon | ............ | G08C 17/02 725/30 |
| 2014/0380183 A1* | 12/2014 | Esaka | ............ | G06F 3/0481 715/740 |
| 2015/0100323 A1* | 4/2015 | Kozuka | ............ | G06F 3/017 704/275 |
| 2015/0145653 A1* | 5/2015 | Katingari | ............ | G06F 1/163 340/12.3 |
| 2015/0213355 A1* | 7/2015 | Sharma | ............ | G06N 3/006 706/11 |
| 2016/0097545 A1* | 4/2016 | Chang | ............ | F24D 19/1009 237/8 A |
| 2016/0195860 A1* | 7/2016 | Ni | ............ | G05B 15/02 700/275 |
| 2018/0045159 A1* | 2/2018 | Patel | ............ | G07C 9/00174 |

* cited by examiner

METHOD AND APPARATUS FOR CONFIGURING WIRELESS REMOTE CONTROL TERMINAL BY THIRD-PARTY TERMINAL

CROSS-REFERENCE TO RELATED APPLICATIONS

The present application is a continuation-in-part of International Application PCT/CN2015/084016, filed Jul. 14, 2015, which international application was published on Nov. 17, 2016, as International Publication WO2016/179891. The International Application claims priority to Chinese Patent Application No. 201510247019.0, filed May 14, 2015, the contents of which are incorporated herein by reference in their entireties.

TECHNICAL FIELD

The present invention relates to the technical field of computer application, and particularly to a method and apparatus for configuring a wireless remote control terminal through a third-party terminal.

BACKGROUND ART

With the development of technology and continuous improvement of people's living standards, more and more modern intelligent household appliances are put into use in daily life and work. In order to facilitate the use of the household appliances, the remote controller is adopted as a remote control device for providing convenience in controlling the household appliances.

Currently, a controlled device is generally controlled by pressing a key on a physical remote controller. However, due to the limitation of the space size of a physical remote controller, it is impossible to place too many physical keys on the physical remote controller. Thus, one remote controller usually corresponds to one controlled device, which thereby cannot realize the one-to-many control (that is, one remote controller controls multiple controlled devices).

DISCLOSURE OF THE INVENTION

The main object of the present invention is to provide a method and apparatus for configuring a wireless remote control terminal through a third-party terminal, in order to solve the problem in the prior art that the home intelligentization and automatization requires high cost in terms of implementation and has a complicated control process, which makes it not conducive to popularization.

According to one aspect of an embodiment of the present invention, there is provided a method for configuring a wireless remote control terminal through a third-party terminal. The wireless remote control terminal is configured to remotely control one or more remotely controlled devices. At a side of the third-party terminal, the method includes: establishing a wireless communication with the wireless remote control terminal; generating, in response to an operation of a user, configuration information for the wireless remote control terminal; and sending, via the wireless communication, the configuration information to the wireless remote control terminal. Furthermore, the wireless remote control terminal is a smart wearable device. The configuration information includes first configuration information, and the step of generating in response to an operation of a user configuration information for the wireless remote control terminal includes: selecting, in response to a device selection operation of the user, one or more remotely controlled devices from a list of remotely controlled devices, and acquiring a remote control instruction of each of the selected remotely controlled devices; determining, in response to an operation behavior setting operation of the user, a corresponding relation between an operation behavior and a remote control function; associating, in response to a behavior-and-device associating operation of the user, the corresponding relation between the operation behavior and the remote control function with the selected remotely controlled device, and establishing, according to an association result and the remote control instruction of the selected remotely controlled device, a corresponding relation among the operation behavior, the remote control function, the remotely controlled device and the remote control instruction; and generating first configuration information, based on the corresponding relation among the operation behavior, the remote control function, the remotely controlled device and the remote control instruction.

Furthermore, the step of determining, in response to an operation behavior setting operation of the user, a corresponding relation between an operation behavior and a remote control function includes: acquiring, in response to a default operation behavior determining operation of the user, a corresponding relation between a pre-stored operation behavior and a remote control function.

Furthermore, the configuration information further includes second configuration information, and the step of generating in response to an operation of a user configuration information for the wireless remote control terminal includes: prompting, after the corresponding relation between the pre-stored operation behavior and the remote control function is acquired, the user to implement the pre-stored operation behavior multiple times; acquiring, from the wireless remote control terminal via the wireless communication, track data generated through the multiple implementations of the pre-stored operation behavior by the user; determining, according to the track data generated through the multiple implementations of the pre-stored operation behavior, an action threshold interval for the pre-stored operation behavior; and generating second configuration information based on the action threshold interval of the pre-stored operation behavior.

Furthermore, the step of determining in response to an operation behavior setting operation of the user a corresponding relation between an operation behavior and a remote control function includes: acquiring, in response to a new operation behavior inputting operation of the user and via the wireless communication, an operation behavior that the user performs on the wireless remote control terminal, and generating a corresponding relation between the acquired operation behavior and a remote control function.

Furthermore, the step of acquiring via the wireless communication an operation behavior that the user performs on the wireless remote control terminal, and generating a corresponding relation between the acquired operation behavior and a remote control function includes: acquiring, via the wireless communication, a touch operation that the user performs on the smart wearable device, and generating a corresponding relation between the touch operation and a function of turning on or off the remotely controlled device; and acquiring, via the wireless communication, a body movement of the user who wears the smart wearable device, and generating a corresponding relation between the body movement and a function of adjusting the remotely controlled device.

Furthermore, the configuration information includes third configuration information, and after the step of establishing a wireless communication with the wireless remote control terminal, the method further includes: reading, via the wireless communication, identification information of the wireless remote control terminal and displaying the identification information. The step of generating, in response to an operation of a user, configuration information for the wireless remote control terminal includes: carrying out, in response to a permission setting operation of the user, permission setting of the wireless remote control terminal, and generating third configuration information based on the permission setting.

Furthermore, after the step of establishing a wireless communication with the wireless remote control terminal, the method further includes: reading, via the wireless communication, a version number of control system software of the wireless remote control terminal; determining, according to the version number, whether the control system software needs to be updated; downloading new control system software from an internet server, if the control system software needs to be updated; and sending, via the wireless communication, the downloaded new control system software to the wireless remote control terminal.

Furthermore, the wireless remote control terminal is a smart watch, and the corresponding relation between the operation behavior and the remote control function includes: a corresponding relation between an operation behavior of sliding clockwise by X degrees on a dial of the smart watch and a function of turning on a device, where X is 90, 108 or 270; a corresponding relation between an operation behavior of sliding counterclockwise by X degrees on the dial of the smart watch and a function of turning off the device; a corresponding relation between a spatial action that an arm on which the smart watch is worn moves from left to right, and a function of enabling a television to be switched to a next channel; a corresponding relation between a spatial action that the arm on which the smart watch is worn moves from right to left, and a function of enabling the television to be switched to a previous channel; a corresponding relation between a spatial action that the arm on which the smart watch is worn moves to draw a circle, and a function of enabling a television program to be saved; a corresponding relation between a spatial action that the arm on which the smart watch is worn moves from left to right, and a function of enabling a temperature of an air conditioner to be raised; a corresponding relation between a spatial action that the arm on which the smart watch is worn moves from right to left, and a function of enabling the temperature of the air conditioner to be decreased; and a corresponding relation between a spatial action of the arm on which the smart watch is worn moves to draw a circle, and a function of enabling a mode of the air conditioner to be changed.

According to another aspect of an embodiment of the present invention, there is further provided a wireless remote control method. At a side of a wireless remote control terminal, the method includes: establishing a wireless communication with a third-party terminal; receiving, via the wireless communication, configuration information sent from the third-party terminal; and remotely controlling one or more remotely controlled devices, according to an operation behavior of a user and the configuration information.

Furthermore, the wireless remote control terminal is a smart wearable device, the configuration information includes first configuration information, the first configuration information includes a corresponding relation among an operation behavior, a remote control function, a remotely controlled device and a remote control instruction, and the step of remotely controlling one or more remotely controlled devices according to an operation behavior of a user and the configuration information includes: receiving an operation behavior of a user; performing, based on received operation behavior of the user, a matching operation on the first configuration information, so as to match out a remotely controlled device and a remote control instruction, with the matched remotely controlled device and the matched remote control instruction corresponding to the received operation behavior of the user; and sending the matched remote control instruction to the matched remotely controlled device.

Furthermore, the configuration information further includes second configuration information, and the second configuration information is an action threshold interval of the operation behavior, the step of remotely controlling one or more remotely controlled devices according to an operation behavior of a user and the configuration information further includes: determining, after the operation behavior of the user is received, whether track data corresponding to the received operation behavior of the user is within the action threshold interval; and executing the step of performing, based on received operation behavior of the user, a matching operation on the first configuration information, so as to match out a remotely controlled device and a remote control instruction with the matched remotely controlled device and the matched remote control instruction corresponding to the received operation behavior of the user, if the track data corresponding to the received operation behavior of the user is within the action threshold interval.

Furthermore, the configuration information further includes third configuration information, and the third configuration information includes information about permission setting, the step of remotely controlling one or more remotely controlled devices according to an operation behavior of a user and the configuration information further includes: determining, before the matched remote control instruction is sent to the matched remotely controlled device, whether the remotely controlled device is allowed to be remotely controlled according to the permission setting; and executing the step of sending the matched remote control instruction to the matched remotely controlled device, if the remotely controlled device is allowed to be remotely controlled according to the permission setting.

In addition, there is further provided a wireless remote control system, which includes: a remotely controlled device; and a wireless remote control terminal configured for remotely controlling one or more remotely controlled devices, where the wireless remote control terminal is configured by any of the methods for configuring a wireless remote control terminal through a third-party terminal as provided in the embodiments of the present invention; and the wireless remote control terminal is a smart wearable device.

In addition, there is further provided an apparatus for configuring a wireless remote control terminal through a third-party terminal. The wireless remote control terminal is configured to remotely control one or more remotely controlled devices. At a side of the third-party terminal, the apparatus includes: a wireless communication module configured to establish a wireless communication with the wireless remote control terminal; a generating module configured to generate, in response to an operation of a user, configuration information for the wireless remote control terminal; and a sending module configured to send, via the wireless communication, the configuration information to the wireless remote control terminal, where the wireless remote control terminal is a smart wearable device.

According to the embodiments of the present invention, in configuring the wireless remote control terminal which remotely controls one or more remotely controlled devices, a third-party terminal is employed. At the side of the third-party terminal, a wireless communication is first established with a wireless remote control terminal; then configuration information for the wireless remote control terminal is generated in response to an operation of a user; and finally, the configuration information is sent to the wireless remote control terminal via the wireless communication. Home intelligentization and automatization can be achieved without additionally using a control center, the cost is low and the control process is simple, which facilitates the overall popularization of intelligent household appliances.

The above description is only a summary of the technical solutions of the present invention. In order to provide a further understanding of the technical means of the present invention and enable the present invention to be implemented according to the contents in the description, and in order to make the foregoing and other objects, features and advantages of the present invention more obvious and easier to understand, exemplary embodiments of the present invention are set forth below.

BRIEF DESCRIPTION OF DRAWINGS

By reading the following detailed description of the optional embodiments, various other advantages and benefits will become clear for those of ordinary skills in the art. The drawings only serve to illustrate the optional embodiments, and should be interpreted as limiting the present invention. Throughout the drawings, same reference signs represent same components. And in the drawings.

DETAILED DESCRIPTION OF EMBODIMENTS

Figure 1:
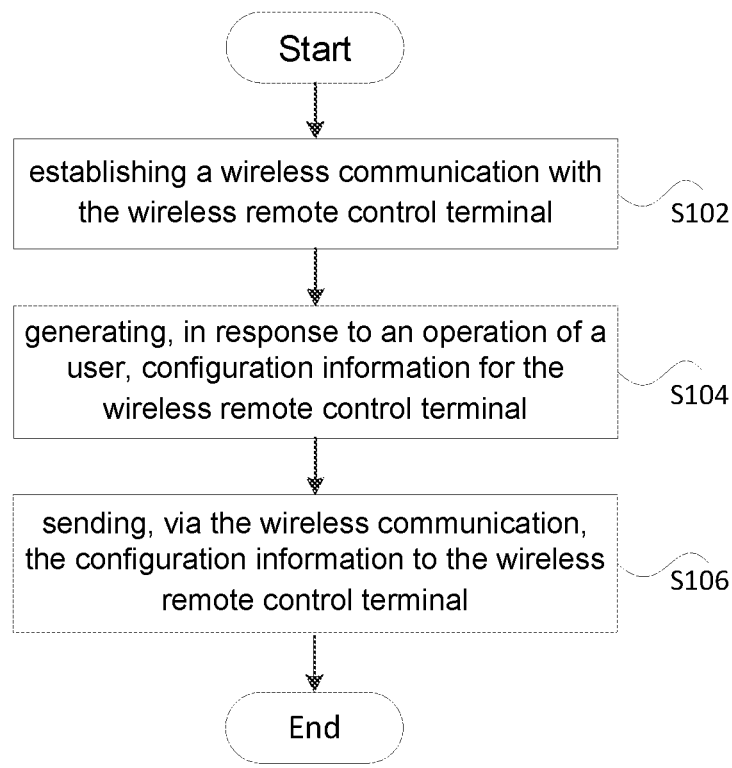
FIG. 1 is a flowchart of a method for configuring a wireless remote control terminal through a third-party terminal according to an embodiment of the present invention.

Below, the present invention is further described in conjunction with embodiments and the drawings. It should be noted that the embodiments of the present application and the features of the embodiments can be combined with each other if there is no conflict.

The inventor has found by investigation that one-to-many control cannot be achieved in the prior art. Thus, in the case of multiple intelligent household appliances to be controlled, there are accordingly multiple remote controllers. Multiple remote controllers would occupy more space, and affect the aesthetics of the space. And if the user wants to use a remote controller, the user has to accurately identify the desired remote controller from the multiple remote controllers to control the corresponding intelligent household appliance, which is inconvenience to use. In order to accurately identify different remote controllers, some users put the remote controllers for controlling different intelligent household appliances at different places; however, this approach requires the user to move to a different place so as to use a different remote controller, which brings poor experience.

In order to solve the above problems, the inventor has conducted much research and thinking. For example, the inventor has wondered about whether the intelligent household appliances can be controlled by additionally providing a control center, so that the control center configures the intelligent household appliances and receives operation instructions from the wireless remote control terminal. However, this approach requires an additional control center, which requires high cost, leads to a complicated control process, and is not conducive to popularization.

For another example, the inventor has also wondered whether the remote control function can be directly integrated into a smartphone, a computer, a PAD and the like which are popular nowadays. Taking a case that the remote control function is integrated into a smartphone as an example, through the integration of the remote control function into a smartphone, the user can control the intelligent household appliances directly by the smartphone. However, it is found by investigation that the feedback from users who control the intelligent household appliances directly by the smartphone is not very good, and there is poor user acceptance. In this regard, the inventor has carried out further investigation and analysis, and found that the reasons why the use feedback about direct usage of a smartphone for remote control is not good mainly include: in the case of using a smartphone to remotely control an intelligent household appliance, the user needs to perform multiple touch operations on the display screen of the smartphone, and thus the user's sight and attention need to switch between the smartphone and the intelligent household appliance to be controlled. For example, in the case where the controlled object is a television, in order to perform operations such as changing the television channel and changing the volume, the user needs to switch his sight and attention from the television to the smartphone and perform touch operations on the smartphone; and after the touch operations on the smartphone are completed, the user needs to switch his sight and attention back to the television to confirm whether the television has completed the corresponding operation; and if the television fails to complete the corresponding operation or there is no evident change, e.g., no evident change in volume, the user needs to switch his sight and attention from the television to the smartphone again and perform touch operations on the smartphone. During such process, due to the switching of the user's sight and attention, the continuity of television watching is affected, and the operations are complicated, resulting in poor user experience.

Based on the above study, in an embodiment of the present invention, a wireless remote control system is described. The system includes a wireless remote control terminal and one or more remotely controlled devices. The wireless remote control terminal is used for remotely controlling the one or more remotely controlled devices. The wireless remote control terminal may be a smart wearable device, such as a smart band, a smart watch, a smart bracelet and a smart glove. The remotely controlled device may be for example an intelligent household appliance. The third-party terminal is one terminal independent of the wireless remote control system, and may be a smartphone, a computer, a PAD and the like in the prior art. The third-party terminal is used for generating, in response to an operation of the user, configuration information for the wireless remote control terminal, and sending, via a wireless communication established with the wireless remote control terminal, the configuration information to the wireless remote control terminal, and the wireless remote control terminal then controls the remotely controlled device according to the received configuration information.

In the solutions provided in the embodiments of the present invention, the design idea in the prior art of additionally providing a control center for centralized control or integrating the remote control function into a smartphone is abandoned, and instead, innovatively and skillfully design is made on the wireless remote control system. With this wireless remote control system, there is no need to add other devices, and the user only needs to generate configuration information in advance by utilizing a common third-party terminal, such as a smartphone, a computer or a PAD, and send the configuration information to a portable smart wearable device; and in subsequent usage, the smart wearable device can be used as a remote control terminal to directly control the remotely controlled device. In the case where the smart wearable device is used as a remote control terminal, the user only needs to select a remotely controlled device and perform a corresponding gesture action so as to enable the control over the remotely controlled device, that is, there is no need for the user to perform any complicated touch operations or switch his sight and attention many times. With such technical solutions, the control is very simple, and is more consistent with the operation habits of the user, and moreover, the sense of science and technology and interestingness of remote control is increased, which make it beneficial for large-scale popularization and application.

At first, an embodiment of the present invention provides, from the perspective of a third-party terminal, a method for configuring a wireless remote control terminal through a third-party terminal. The method mainly describes a process in which the third-party terminal provides configuration information to the wireless remote control terminal. Referring to FIG. 1, the method may include steps as follows.

In step S102, a wireless communication is established with the wireless remote control terminal.

For example, the third-party terminal and the wireless remote control terminal both may send a bluetooth signal; and after searching and matching, communication is established between the third-party terminal and the wireless remote control terminal. Alternatively, the communication may also be established by other wireless signals.

In step S104, in response to an operation of a user, configuration information is generated for the wireless remote control terminal.

For example, an application (APP) dedicated to configuring the wireless remote control terminal may be installed in the third-party terminal, and through an operation that the user performs on the APP, the configuration information for the wireless remote control terminal is generated.

The configuration information can include information about remote control permission of the wireless remote control terminal. For example, after the communication is established between the third-party terminal and the wireless remote control terminal, identification information, such as ID number, of the wireless remote control terminal is acquired, the acquired ID number is displayed to the user, and at the same time, the following options are provided: an option of adopting default permission setting; an option of only allowing the control over a television rather than an air conditioner; an option of disabling the control over any device, and so on. The user may select one or more of the options to realize the permission setting of the wireless remote control terminal. In response to such selection operations of the user, the third-party terminal completes the permission setting, and uses information thereof as the configuration information for the wireless remote control terminal. After receiving the configuration information about remote control permission, the wireless remote control terminal can only remotely control a remotely controlled device within the permission range. For example, if the remote control permission of a certain wireless remote control terminal is that the wireless remote control terminal is only allowed to control a television but not an air conditioner, an operation that the user performs on the wireless remote control terminal to control the air conditioner is an invalid operation.

The configuration information may further include a corresponding relation among an operation behavior (for example, an operation behavior of sliding, in an arc, clockwise by 90 degrees on a dial of a smart watch, and an operation behavior that the hand on which the smart watch is worn moves to draw a circle in the air), a remote control function (e.g., a function of turning on or off a device), a remotely controlled device and a remote control instruction. The operation behavior may be a preset default operation behavior, or an operation behavior input by a user. After the user selects the default operation behavior or the input operation behavior, the third-party terminal provides to the user an operation interface for establishing a corresponding relation between the operation behavior and a remote control function, so as to correlate the operation behavior with the remote control function in response to the operation of the user. Moreover, the third-party terminal automatically acquires, from an internet server, a remotely controlled device and a remote control instruction which correspond to the remote control function, and associates, according to the remote control function, the remotely controlled device and the remote control instruction with the operation behavior which have been correlated with the remote control function, that is, the corresponding relation among the operation behavior, the remote control function, the remotely controlled device and the remote control instruction can be established. The corresponding relation may be obtained from a corresponding relation table composed of four columns and N rows, in which the four columns are allocated to the operation behavior, the remote control function, the remotely controlled device and the remote control instruction, respectively, and each row forms one record. After the wireless remote control terminal receives the configuration information, once the user performs an operation behavior on the wireless remote control terminal, one record may be matched out from the corresponding relation table based on the operation behavior of the user, and then the remote control instruction in the matched record is sent to the remotely controlled device in the matched record.

The configuration information may also include an action threshold interval of the operation behavior (e.g., for the operation behavior of sliding, in an arc, clockwise by 90 degrees on the dial of the smart watch, the action threshold interval is ±5 degrees), and the following options may be provided to the user: an option of adopting a default action threshold interval; an option of directly inputting an action threshold interval; and an option of intelligently determining an action threshold interval. If the user selects to adopt a default action threshold interval, the predetermined action threshold interval can be directly used. If the user selects to directly input an action threshold interval, an interface for inputting an action threshold interval is provided to the user and the user may manually input an action threshold interval. If the user selects to intelligently determine an action threshold interval, the user will be prompted to perform operation behaviors on the wireless remote control terminal; and for each operation behavior, the user implements this operation behavior on the wireless remote control terminal many times, track data generated through the multiple implementations of this operation behavior by the user is acquired, and then error among the track data generated through the individual implementations of this operation behavior is analyzed, so as to determine the action threshold interval of this operation behavior. For example, the operation behavior of sliding, in an arc, clockwise by 90 degrees on the dial of the smart watch is implemented three times, and the actual angles for the three implementations are 87 degrees, 90 degrees and 95 degrees, thus it is determined that the action threshold interval of this operation behavior is −3 degrees to 5 degrees.

If the configuration information includes the corresponding relation among the operation behavior, the remote control function, the remotely controlled device and the remote control instruction, and the operation behavior in the corresponding relation is an operation behavior inputted by the user, then in the progress that the user inputs an operation behavior, the action threshold interval of the operation behavior is determined by the method of intelligently determining an action threshold interval.

After the wireless remote control terminal receives the configuration information about the action threshold interval, once the user implements the operation behavior, the wireless remote control terminal first determines whether the operation behavior implemented by the user go beyond the corresponding action threshold interval, if yes, the operation behavior is directly determined as an invalid action, and if not, the remotely controlled device and the remote control instruction which correspond to the operation behavior are further determined.

In step S106, the configuration information is sent to the wireless remote control terminal via the wireless communication.

After the configuration information is obtained in step S104, the configuration information is sent to the wireless remote control terminal in this step.

With this embodiment, the configuration information that the wireless remote control terminal requires to remotely control the one or more remotely controlled devices is determined by the third-party terminal in response to the user's operation, and the existing smartphones, computers or the like can be used as the third-party terminal. In this way, the home intelligentization and automatization can be achieved without additionally using a control center, but with a low cost and a simple control process, which is beneficial to the overall popularization of intelligent household appliances.

Figure 2:
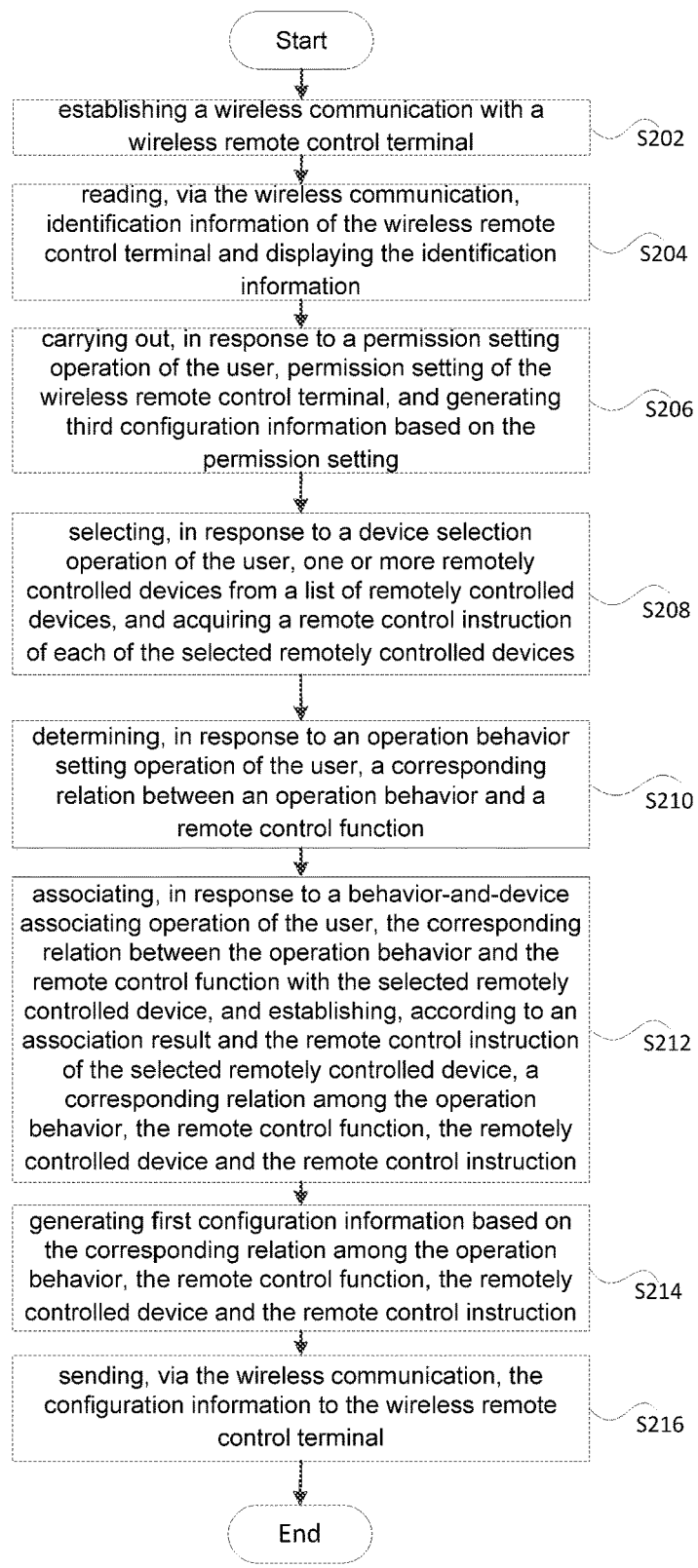
FIG. 2 is a flowchart of a method for configuring a wireless remote control terminal through a third-party terminal according to another embodiment of the present invention.

Another embodiment is provided, which is an alternative method for configuring a wireless remote control terminal through a third-party terminal on the basis of the above embodiment. Referring to FIG. 2, the method may include steps as follows.

In step S202, a wireless communication is established with a wireless remote control terminal.

For example, the third-party terminal and the wireless remote control terminal both may send a bluetooth signal; and after searching and matching, communication is established between the third-party terminal and the wireless remote control terminal. Alternatively, the communication may also be established by other wireless signals.

In step S204, identification information of the wireless remote control terminal is read via the wireless communication, and is displayed.

For example, the identification information may be an ID number of the wireless remote control terminal. After the wireless communication is established, the third-party terminal automatically reads the ID number of the wireless remote control terminal, and displays the acquired ID number on a permission setting interface, to prompt the user to perform a permission setting operation for the ID number.

In step S206, the permission setting of the wireless remote control terminal is carried out in response to a permission setting operation of the user, and information about the permission setting is used as third configuration information.

The user's input, i.e., the permission setting operation of the user, may be received through the permission setting interface. For example, multiple permission options are provided on the permission setting interface, and a selection box is provided in front of each of the permission options; if the user selects a certain selection box (this operation of selecting a selection box is the permission setting operation, e.g., a selection box may be selected once this selection box is clicked), it indicates that the user has selected the permission option following this selection box, that is, the permission setting of the wireless remote control terminal is carried out. Then, the third-party terminal takes the information about the permission setting as the third configuration information.

In step S208, in response to a device selection operation of the user, one or more remotely controlled devices are selected from a list of remotely controlled devices, and a remote control instruction of each of the selected remotely controlled devices is acquired.

After the permission setting is carried out, the third-party terminal acquires and displays the list of remotely controlled devices, where either a list of remotely controlled devices that is stored in the third-party terminal, or a latest list of remotely controlled devices that is read by the third-party terminal from the internet server may be displayed. No matter how the list of remotely controlled devices is acquired, after the list of remotely controlled devices is displayed to the user, the user may select therefrom one or more remotely controlled devices. Further, the third-party terminal acquires, according to the remotely controlled device selected by the user, a corresponding remote control instruction. It is also possible to pre-store a remote control instruction library in the third-party terminal, and thus the remote control instruction of the remotely controlled device selected by the user may be acquired from the remote control instruction library; alternatively, the remote control instruction of the remotely controlled device selected by the user may also be downloaded from the internet server.

In step S210, in response to an operation behavior setting operation of the user, a corresponding relation between an operation behavior and a remote control function is determined.

An option of selecting a corresponding relation between a default operation behavior and a remote control function can be provided to the user. If the user selects this option (the operation of selecting this option is a default operation behavior determining operation), a default corresponding relation is used. In this case, optionally, after the corresponding relation between the pre-stored (i.e., default) operation behavior and a remote control function is acquired, the user is prompted to implement the pre-stored operation behavior many times. For each of such pre-stored operation behaviors, when the user implements this operation behavior on the wireless remote control terminal, the wireless remote control terminal records the track data generated therefrom; the third-party terminal acquires, via the wireless communication, the track data recorded by the wireless remote control terminal, determines an action threshold interval of this operation behavior according to the track data generated through multiple implementations of this operation behavior. Then, configuration information is generated based on the action threshold interval of each default operation behavior, and the configuration information is sent to the wireless remote control terminal.

Alternatively, an option of selecting a user-defined operation behavior may be provided to the user. If the user selects this option, the user may customize the operation behavior corresponding to each remote control function. For a certain remote control function, when the user implements an operation behavior on the wireless remote control terminal, the third-party terminal acquires, via the wireless communication, the operation behavior implemented by the user on the wireless remote control terminal, and generates a corresponding relation between the acquired operation behavior and this remote control function. Specifically, the wireless remote control terminal may be a smart wearable device, where the smart wearable device can sense a touch operation that the user performs thereon; and when being worn on the user, the smart wearable device can also sense a body movement of the user. After acquiring, via the wireless communication, a touch operation that the user performs on the smart wearable device, the third-party terminal generates a corresponding relation between the touch operation and a function of turning on or off the remotely controlled device. After acquiring, via the wireless communication, a body movement of the user who wears the smart wearable device, the third-party terminal generates a corresponding relation between the body movement and a function of adjusting the remotely controlled device. Optionally, for each operation behavior, the track data generated through each implementation of this operation behavior by the user is acquired via the wireless communication, the action threshold interval of this operation behavior is determined according to multiple pieces of the track data corresponding to this operation behavior. Then, configuration information is generated based on the action threshold interval of each operation behavior and is sent to the wireless remote control terminal.

In step S212, in response to a behavior-and-device associating operation of the user, the corresponding relation between the operation behavior and the remote control function is associated with the selected remotely controlled device; and according to an association result and the remote control instruction of the selected remotely controlled device, a corresponding relation among the operation behavior, the remote control function, the remotely controlled device and the remote control instruction is established.

By step S208, the remotely controlled device and the corresponding remote control instruction can be obtained; by step S210, the corresponding relation between the operation behavior and the remote control function can be obtained; and by step S212, the corresponding relation among the operation behavior, the remote control function, the remotely controlled device and the remote control instruction is established.

In step S214, first configuration information is generated based on the corresponding relation among the operation behavior, the remote control function, the remotely controlled device and the remote control instruction.

In step S216, the configuration information is sent to the wireless remote control terminal via the wireless communication.

Optionally, before the configuration information is sent to the wireless remote control terminal, the version number of control system software of the wireless remote control terminal may be read via the wireless communication, and whether the control system software needs to be updated is determined according to the version number; and if the control system software needs to be updated, new control system software may be downloaded from the internet server, and the downloaded new control system software may be sent to the wireless remote control terminal via the wireless communication.

Figure 3:
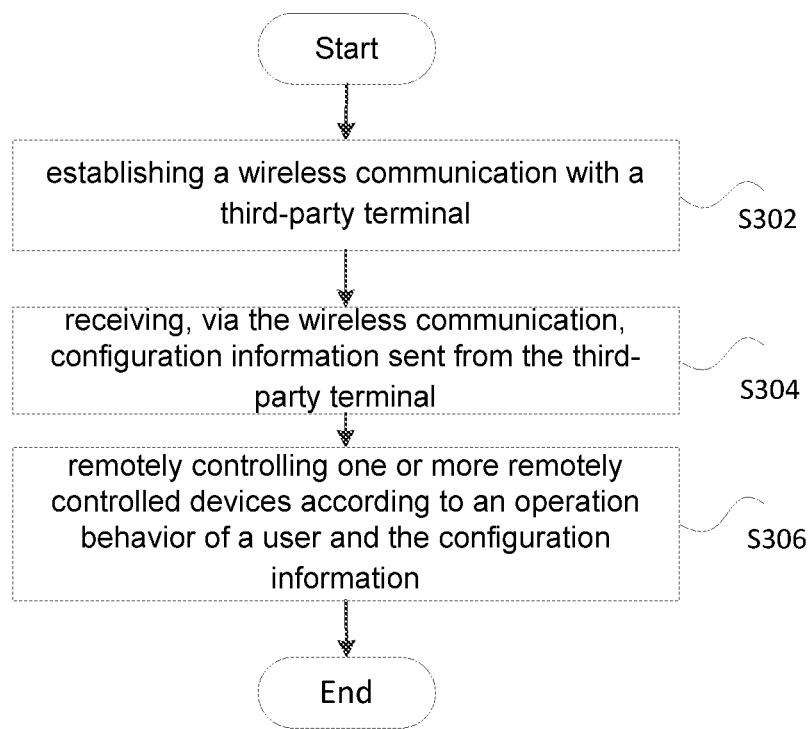
FIG. 3 is a flowchart of a wireless remote control method according to an embodiment of the present invention.

Another embodiment is provided, which presents a wireless remote control method from the perspective of the wireless remote control terminal. The method mainly describes a process in which the wireless remote control terminal receives the configuration information sent from the third-party terminal, and remotely controls the remotely controlled device. Referring to FIG. 3, the method may include steps as follows.

In step S302, a wireless communication is established with a third-party terminal.

For example, the third-party terminal and the wireless remote control terminal both may send a bluetooth signal; and after searching and matching, communication is established between the third-party terminal and the wireless remote control terminal. Alternatively, the communication may also be established by other wireless signals.

In step S304, configuration information sent from the third-party terminal is received via the wireless communication.

The configuration information includes the configuration information as described in the above embodiments, and is not repeated herein.

In step S306, one or more remotely controlled devices are remotely controlled according to an operation behavior of a user and the configuration information.

Specifically, the configuration information includes first configuration information, second configuration information and third configuration information, where the first configuration information is a corresponding relation among an operation behavior, a remote control function, a remotely controlled device and a remote control instruction, the second configuration information includes the action threshold interval of the operation behavior, and the third configuration information includes information about the permission setting. In this case, step S306 includes:

step S3060: receiving an operation behavior of the user;

step S3061: determining whether the track data corresponding to the received operation behavior of the user is within the action threshold interval;

step S3062: determining the received operation behavior as an invalid action if the track data corresponding to the received operation behavior of the user is not within the action threshold interval, and prompting the user that the operation is invalid;

step S3063: performing, based on the received operation behavior of the user, a matching operation on the first configuration information, so as to match out a remotely controlled device and a remote control instruction which correspond to the received operation behavior of the user, if the track data corresponding to the received operation behavior of the user is within the action threshold interval;

step S3064: determining whether the remotely controlled device is allowed to be remotely controlled according to the permission setting;

step S3065: prompting the user that the wireless remote control terminal cannot remotely control the remotely controlled device, if the remotely controlled device is not allowed to be remotely controlled according to the permission setting; and step S3066: sending the matched remote control instruction to the matched remotely controlled device, if the remotely controlled device is is allowed to be remotely controlled according to the permission setting.

Figure 4:
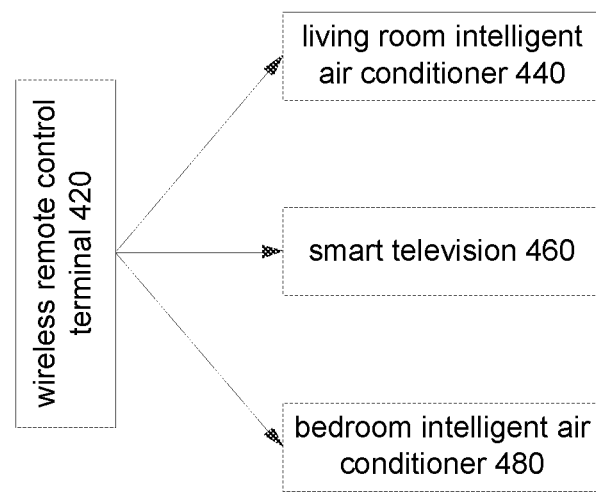
FIG. 4 is a schematic diagram of a wireless remote control system according to an embodiment of the present invention.

Another embodiment provides a wireless remote control system. The wireless remote control system includes a wireless remote control terminal and multiple remotely controlled devices. As shown in FIG. 4, the remotely controlled devices include a living room intelligent air conditioner 440, a smart television 460 and a bedroom intelligent air conditioner 480. The wireless remote control terminal 420 is configured for remotely controlling one or more remotely controlled devices. The wireless remote control terminal may be configured by any of the methods for configuring a wireless remote control terminal through a third-party terminal as provided in the above embodiments. In this embodiment, taking the case where the third-party terminal is a smartphone as an example, the process of configuring a wireless remote control terminal, such as a personal control instruction input terminal, through the smartphone is described as follows.

The user installs configuration software on his smartphone and sets a password. The configuration software is used for executing any of the methods for configuring a wireless remote control terminal through a third-party terminal as provided in the above embodiments. For example, the configuration software may be the APP as mentioned in the above embodiments.

The user enables the bluetooth function of the personal control instruction input terminal and the bluetooth function of the smartphone, and a wireless communication is established between the personal control instruction input terminal and the smartphone.

The configuration software on the smartphone checks the control system software version of the personal control instruction input terminal, and if an updated version is available, the configuration software of the smartphone downloads from the internet the software of the latest version and then sends the same to the personal control instruction input terminal.

The configuration software on the smartphone reads, from the personal control instruction input terminal, the ID of the personal control instruction input terminal, and displays the ID to the user, so as to request the user to perform permission setting for the ID. The user may select the default permission setting, or the user may also perform particular permission setting for a certain ID alone. For example, for a certain ID, only the control over a television is allowed and the control over an air conditioner is not allowed, or the personal control instruction input terminal with the ID is prohibited from controlling any device, and so on.

After the permission setting is carried out for the personal control instruction input terminal, the user is required to add devices that need to be controlled. At this time, the configuration software on the smartphone reads from the internet server the latest list of remotely controlled devices, and the user selects therefrom the type and model of the devices to be controlled. For example, the user selects one television of a certain model to be controlled, one air conditioner of a certain model to be controlled and one intelligent door lock of a certain model to be controlled.

After the user makes the selection, the configuration software downloads, from the internet server, real remote control instructions corresponding to the selected devices.

Moreover, the user needs to determine what kind of operation behavior will be adopted for achieving specific control over the remotely controlled device. In the default mode, the user's daily remote control operation includes a combination of touch operations and body movements such as personal gesture actions, where the remotely controlled device may be turned on or off by a touch operation, and the remotely controlled device may be adjusted and controlled by a body movement. The user can also change the remote control mode to a full-touch operation remote control mode. Here, the case where the user selects to use the operation behaviors in the default mode is used as an example, and the default mode is as shown in table 1 and table 2 below.

TABLE 1

| operation behaviors | remote control functions | remotely controlled devices |
|---|---|---|
| sliding, in an arc, clockwise by 90 degrees | opening | entrance door |
| sliding, in an arc, clockwise by 180 degrees | turning on | television |
| sliding, in an arc, clockwise by 270 degrees | turning on | air conditioner |

TABLE 2

| operation behaviors | remote control functions | remotely controlled devices |
|---|---|---|
| spatial action from left to right | switching to a next television channel | television |
| spatial action from right to left | switching to a previous television channel | television |
| action of drawing a circle in the air | saving | television |
| spatial action from left to right | raising the temperature | air conditioner |
| spatial action from right to left | decreasing the temperature | air conditioner |
| action of drawing a circle in the air | changing the mode | air conditioner |

After the user determines to adopt the default mode, the configuration software of the smartphone prompts the user to associate the default touch operation with the remotely controlled device, and associate the default body movement with the remotely controlled device. For example, the user associates the intelligent door lock with a touch operation of "sliding a finger, in an arc, clockwise by 90 degrees on the dial of the personal control instruction input terminal", and the user associates the television with a touch operation of "sliding a finger, in an arc, clockwise by 180 degrees on the dial of the personal control instruction input terminal". For example, the user associates the television with a body movement of "spatial action from left to right", and the user associates the air conditioner with a body movement of "spatial action from right to left". After the association between the operation behaviors and the remotely controlled devices is completed, the configuration software updates table 1 and table 2, specifically, the remotely controlled devices are updated to terminals of a specific device model, and the downloaded actual remote control instructions are added to the list, and a corresponding relation table including the corresponding relation among the operation behavior, the remote control function, the remotely controlled device and the remote control instruction as described in the above embodiment, as shown in table 3 and table 4 below.

The configuration software on the smartphone will prompt the user to perform the default operation behavior, such as an operation behavior that an arm on which the personal control instruction input terminal is worn waves from left to right, the user repeats this action 2-3 times, and the configuration software on the smartphone may give a recommended action threshold interval for this action. If the user selects to accept this action threshold interval, in subsequent daily operations, the personal control instruction input terminal system would determine such an operation behavior as an valid action as long as the data of this operation behavior is within the action threshold interval. The purpose for requesting the user to repeat this operation behavior is to automatically calculate an action threshold interval in one aspect, and to let the user to learn about the action of issuing an instruction in another aspect. The user may select to skip this learning process, and complete this setting by directly inputting an action threshold interval.

TABLE 3

| operation behaviors | remote control functions | remotely controlled devices |
|---|---|---|
| sliding, in an arc, clockwise by 90 degrees | opening | entrance door 123 |
| sliding, in an arc, clockwise by 180 degrees | turning on | television XYZ |
| sliding, in an arc, clockwise by 270 degrees | turning on | air conditioner ABC |

TABLE 4

| operation behaviors | remote control functions | remotely controlled devices | remote control instructions |
|---|---|---|---|
| spatial action from left to right | switching to a next television channel | television XYZ | instruction 1 |
| spatial action from right to left | switching to a previous television channel | television XYZ | instruction 2 |
| action of drawing a circle in the air | saving | television XYZ | instruction 3 |
| spatial action from left to right | raising the temperature | air conditioner ABC | instruction 4 |
| spatial action from right to left | decreasing the temperature | air conditioner ABC | instruction 5 |
| action of drawing a circle in the air | changing the mode | air conditioner ABC | instruction 6 |

After the setting of the action threshold interval is completed, the configuration software on the smartphone sends to the personal control instruction input terminal all the configuration information including the ID permission setting, the above table 3 and table 4, etc.

In this embodiment, the process that the wireless remote control terminal (i.e., the personal control instruction input terminal) controls the remotely controlled device is as follows.

The user who wears the personal control instruction input terminal sits in the living room at home, the user lifts the wrist and slides a finger, in an arc, clockwise by an angle of 180 degrees on the dial of the personal control instruction input terminal, or performs other actions (e.g., sliding a finger vertically downward by 5-10 cm on the dial) preset by himself.

The personal control instruction input terminal performs a matching operation on the received configuration information (e.g., table 3), and interprets the operation behavior as an instruction of turning on the television.

The personal control instruction input terminal then determines whether the ID of the terminal is allowed to remotely control the television, and if allowed, the personal control instruction input terminal sends the corresponding instruction of turning on the television to the television via a bluetooth signal or an infrared signal.

After sending the instruction of turning on the television, the personal control instruction input terminal notifies, through a light or vibration signal, the user that the previous instruction has been executed.

The user may wave the arm on which the personal control instruction input terminal is worn from left to right once or twice continuously. The personal control instruction input terminal would collect the movement track data of this series of actions, e.g., continuous X, Y and Z coordinates and acceleration values, and interpret the data through a built-in program; and if the data is within the preset action threshold interval, the personal control instruction input terminal would determine the action as a valid action instruction, and then performing a matching operation on the received configuration information (e.g., the above table 4), so as to conclude that the action that the user's arm waves once from left to right indicates a function of switching to the next television channel.

The user slides a finger counterclockwise by an angle of 180 degrees on the dial of the personal control instruction input terminal, or performs other actions (e.g., sliding a finger vertically upward by 5-10 cm on the dial) preset by himself.

The personal control instruction input terminal performs a matching operation on the received configuration information (e.g., table 3 above), and interprets the operation behavior as an instruction of turning off the television, and sends the corresponding instruction of turning off the television to the television via the bluetooth signal or infrared signal.

In this embodiment, if the user intends to modify the default operation behavior mode in the third-party terminal, the operation process is as follows.

The user accesses to the configuration software on the smartphone or the computer, and the configuration software may provide an option of modifying the default operation behavior; and once the user selects this option, the default operation behavior may be modified. The user selects the option of modifying the default operation behavior, and the configuration software displays the current default operation behaviors. The user selects a certain operation behavior to be modified, and the configuration software prompts the user who wears the personal control instruction input terminal performs a new action 3 times. The user implements this action according to the prompt, the configuration software gives a graphical illustration of the new action and a recommended action threshold interval, and the user selects to accept the recommended action threshold interval or directly input an action threshold interval. The configuration software then replaces the setting related to the original action with the data and action threshold interval of the new action. After the configuration software downloads the configuration information including the modified operation behavior to the personal control instruction input terminal, the user can use the new action for remote control.

In this embodiment, if the user intends to add a new operation behavior to the default operation behavior mode, the operation process is as follows.

The user accesses to the configuration software on the smartphone or the computer, and the configuration software may provide an option of adding a new operation behavior to the default operation behaviors; and once the user selects this option, a new operation behavior may be added to the default operation behaviors. The user selects the option of adding a new operation behavior, and the configuration software prompts the user who wears the personal control instruction input terminal performs a new action 3 times. The user implements this action according to the prompt, the configuration software gives a graphical illustration of the new action and a recommended action threshold interval, and the user selects to accept the recommended action threshold interval or directly input an action threshold interval. The configuration software updates the default operation behaviors, and prompts the user to associate the new action instruction with a remotely controlled device. The user selects a remotely controlled device from the device list. All the real remote control functions supported by the remotely controlled device are stored at the internet server. The configuration software downloads, from the internet server, all the remote control functions supported by the device selected by the user. The user associates, by the configuration software, the new operation behavior with a new supported remote control function. After the configuration software downloads the configuration information including the modified operation behavior to the personal control instruction input terminal, the user can use the new action for remote control. In the default list, there are only common remote control functions of the remotely controlled devices, and this design serves to avoid the necessity for the user to remember too many operation behaviors.

In this embodiment, if the user modifies the operation mode to a full-touch operation mode, the operation process is as follows.

The user accesses to the configuration software on the smartphone or computer. Since there is a limited area on the dial of the personal control instruction input terminal for touch operation, the full-touch operation mode is suitable for the case where there are not too may remotely controlled devices. The configuration software gives a prompt to the user as to whether the full-touch operation mode is to be selected. After the user selects the option of the full-touch operation mode, the user firstly selects, by the configuration software, a first device that needs to be remotely controlled. The configuration software downloads, from the internet server, all the remote control functions supported by the selected device and displays the same to the user, in which common functions will be recommended by giving prompts, e.g., by highlighting, so as to make the user select a corresponding remote control function and then perform touch operation association setting. For example, the user selects the function of turning on the television, and slides a finger from left to right by 10 cm on the dial of the personal control instruction input terminal; the configuration software prompts the user to repeat this action 3 times, and then gives a graphical illustration of the action and a recommended action threshold interval; the user selects to accept the recommended action threshold interval or directly input an action threshold interval, thereby accomplishing the association between the function of turning on a television of a certain model and the touch action instruction of sliding from left to right by 10 cm. In a similar manner, the user completes the setting of action instruction set for the first remotely controlled device. The user selects, by the configuration software, a second device to be remotely controlled. The configuration software downloads, from the internet server, all the remote control functions supported by the selected device and displays the same to the user, in which common functions will be recommended by giving prompts, e.g., by highlighting, so as to make the user select a corresponding remote control function and then perform the touch operation association setting. The operations and setting related to the second device are similar to those related to the first device, except that the configuration software will determine whether there is a conflict between the action settings for the two devices when the user defines a touch operation action. For example, if the user defines that the second device is a television and also defines that this television will be turned on (that is to select television 2) according to the action of sliding from left to right by 10 cm, this setting is determined to be invalid and a prompt will be given to the user. After the user has completed all the settings, the configuration software will download the configuration information including all the related settings to the software of the personal control instruction input terminal.

It should be noted that, the remotely controlled devices in the wireless remote control system either may be traditional household appliances to which the wireless remote control terminal sends a remote control instruction via an infrared signal, or may be novel intelligent household appliances to which the wireless remote control terminal sends a remote control instruction via a bluetooth signal. For the two kinds of remotely controlled devices, the only difference is that different signals carrying the remote control instruction are adopted, but the control mechanisms for realizing remote control are the same.

Figure 5:
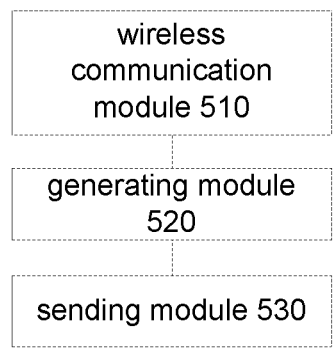
FIG. 5 is a block diagram of an apparatus for configuring a wireless remote control terminal through a third-party terminal according to an embodiment of the present invention.

Corresponding to the method for configuring a wireless remote control terminal through a third-party terminal as provided in the above embodiment of the present invention, an apparatus for configuring a wireless remote control terminal through a third-party terminal is also provide by an embodiment of the present invention. The apparatus is located at the third-party terminal. Referring to FIG. 5, the apparatus may include a wireless communication module 510, a generating module 520 and a sending module 530.

The wireless communication module 510 is configured for establishing a wireless communication with the wireless remote control terminal. For example, the third-party terminal and the wireless remote control terminal both send a bluetooth signal; and after searching and matching, communication is established between the third-party terminal and the wireless remote control terminal. Alternatively, the communication may also be established by other wireless signals.

The generating module 520 is configured for generating, in response to an operation of a user, configuration information of the wireless remote control terminal.

Optionally, the configuration information includes first configuration information, and the generating module 520 includes: a first responding module configured for selecting, in response to a device selection operation of the user, one or more remotely controlled devices from a list of remotely controlled devices, and acquiring a remote control instruction of each of the selected remotely controlled devices; a second responding module configured for determining, in response to an operation behavior setting operation of the user, a corresponding relation between an operation behavior and a remote control function; a third responding module configured for associating, in response to a behavior-and-device associating operation of the user, the corresponding relation between the operation behavior and the remote control function with the selected remotely controlled device, and establishing, according to an association result and the remote control instruction of the selected remotely controlled device, a corresponding relation among the operation behavior, the remote control function, the remotely controlled device and the remote control instruction; and a first configuration information generating module configured for generating first configuration information based on the corresponding relation among the operation behavior, the remote control function, the remotely controlled device and the remote control instruction.

Specifically, the second responding module is configured for: acquiring, in response to a default operation behavior determining operation of the user, a corresponding relation between a pre-stored operation behavior and a remote control function. Optionally, the configuration information further includes second configuration information, and the generating module 520 further includes: a prompting module configured for prompting, after the corresponding relation between the pre-stored operation behavior and the remote control function is acquired, the user to implement the pre-stored operation behavior multiple times; an acquiring module configured for acquiring, via the wireless communication, track data generated through the multiple implementations of the pre-stored operation behavior by the user; a determining module configured for determining, according to the track data generated through the multiple implementations of the pre-stored operation behavior, an action threshold interval of the pre-stored operation behavior; and a second configuration information generating module configured for generating second configuration information based on the action threshold interval of the pre-stored operation behavior.

Specifically, the second responding module may be further configured for: acquiring, in response to a new operation behavior inputting operation of the user and via the wireless communication, an operation behavior that the use performs on the wireless remote control terminal, and generating a corresponding relation between the acquired operation behavior and a remote control function.

In the case where the wireless remote control terminal is a smart wearable device, the second responding module acquiring via the wireless communication an operation behavior that the user performs on the wireless remote control terminal and generating a corresponding relation between the acquired operation behavior and a remote control function includes: acquiring, via the wireless communication, a touch operation that the user performs on the smart wearable device, and generating a corresponding relation between the touch operation and a function of turning on or off the remotely controlled device; and acquiring, via the wireless communication, a body movement of the user who wears the smart wearable device, and generating a corresponding relation between the body movement and a function of adjusting the remotely controlled device.

Further, optionally, the configuration information includes third configuration information, and the apparatus further includes: a first reading module configured for reading, after the wireless communication is established with the wireless remote control terminal, identification information of the wireless remote control terminal via the wireless communication and displaying the identification information; and the generating module 520 is further configured for carrying out, in response to a permission setting operation of the user, permission setting of the wireless remote control terminal, and generating third configuration information based on the permission setting.

Further, optionally, the apparatus further includes: a second reading module configured for reading, after the wireless communication is established with the wireless remote control terminal, version number of control system software of the wireless remote control terminal via the wireless communication; a determining module configured for determining, according to the version number, whether the control system software needs to be updated; and an updating module configured for downloading new control system software from an internet server if the control system software needs to be updated, and sending, via the wireless communication, the downloaded new control system software to the wireless remote control terminal.

In the method and apparatus for configuring a wireless remote control terminal through a third-party terminal provided by the embodiments of the present invention, the wireless remote control terminal is configured through a third-party terminal, and then the wireless remote control terminal controls one or more remotely controlled devices. The third-party terminal may be a device that is easy for the user to operate, such as a smartphone, a computer and a PAD. The wireless remote control terminal is a portable personal control instruction input terminal such as a smart wearable device. While various remotely controlled devices are flexibly controlled by means of the architecture of the third-party terminal and the wireless remote control terminal, with the skillful selection for the third-party terminal and the wireless remote control terminal, the configuration for the wireless remote control terminal can be achieved directly by using a device that is very popular in the internet age today, can be easily operated by the user and is almost owned by everyone, e.g., a smartphone, a computer and a PAD, without adding any other devices. At the time of implementing a remote control operation, there is no need for the user to perform any complicated key-pressing operations or switch sight and attention; instead, after wearing the smart wearable device and selecting the remotely controlled device, the user can control the selected remotely controlled device just through corresponding gesture actions. With such technical solutions, the control is very simple, and is more consistent with the operation habits of the user, and moreover, the sense of science and technology and interestingness of remote control is increased, which make it beneficial for large-scale popularization and application.

It should be noted that the apparatus or system embodiments above are optional embodiments, the units and modules involved are not necessarily required for the present application.

The various embodiments in the present description are all described in a progressive manner, each embodiment focuses on the aspects by which it differs from other embodiments, and as to the same or similar aspects among the embodiments, mutually reference can be made. For the apparatus embodiments in the present application, since they are substantially similar to the method embodiments, only brief description is given, and as to the details, reference can be made to the corresponding part in the method embodiments.

The above descriptions are only preferable embodiments of the present invention, but the scope of protection of the present invention is not limited thereto. Any changes or replacements that would readily be conceivable to those skilled in the art within the technical scope disclosed by the present invention shall be covered by the scope of protection of the present invention. Therefore, the scope of protection of the present invention shall be determined by the scope of protection of the appended claims.

INDUSTRIAL APPLICABILITY

According to the method and apparatus for configuring a wireless remote control terminal through a third-party terminal as provided by the embodiments of the present invention, in configuring the wireless remote control terminal which remotely controls or more remotely controlled devices, a third-party terminal is employed. The existing smartphones, computers or the like may be used as the third-party terminal. At the side of the third-party terminal, a wireless communication is first established with the wireless remote control terminal; then configuration information for the wireless remote control terminal is generated in response to an operation of a user; and finally, the configuration information is sent to the wireless remote control terminal via the wireless communication. The wireless remote control terminal is a wearable device. Just by using a wearable device as a wireless remote control terminal to control a remotely controlled device, home intelligentization and automatization can be achieved, the cost is low and the control process is simple, which facilitates the overall popularization of intelligent household appliances.

The invention claimed is:

1. A method for configuring a wireless remote control terminal through a third-party terminal, the wireless remote control terminal being configured to remotely control one or more remotely controlled devices, wherein at a side of the third-party terminal, the method comprises:
   establishing a wireless communication with the wireless remote control terminal;
   generating, in response to an operation of a user, configuration information for the wireless remote control terminal; and
   sending, via the wireless communication, the configuration information to the wireless remote control terminal,
   wherein the wireless remote control terminal is a smart wearable device; the configuration information comprises first configuration information, and the step of generating in response to an operation of a user configuration information for the wireless remote control terminal comprises:
   selecting, in response to a device selection operation of the user, one or more remotely controlled devices from a list of remotely controlled devices, and
   acquiring a remote control instruction of each of the selected remotely controlled devices;
   determining, in response to an operation behavior setting operation of the user, a corresponding relation between an operation behavior and a remote control function;
   associating, in response to a behavior-and-device associating operation of the user, the corresponding relation between the operation behavior and the remote control function with the selected remotely controlled device, and
   establishing, according to an association result and the remote control instruction of the selected remotely controlled device, a corresponding relation among the operation behavior, the remote control function, the remotely controlled device and the remote control instruction; and
   generating first configuration information, based on the corresponding relation among the operation behavior, the remote control function, the remotely controlled device and the remote control instruction,
   wherein the step of determining, in response to an operation behavior setting operation of the user, a corresponding relation between an operation behavior and a remote control function comprises:
   acquiring, in response to a default operation behavior determining operation of the user, a corresponding relation between a pre-stored operation behavior and a remote control function, wherein the configuration information further comprises second configuration information, and the step of generating in response to an operation of a user configuration information for the wireless remote control terminal comprises:
   prompting, after the corresponding relation between the pre-stored operation behavior and the remote control function is acquired, the user to implement the pre-stored operation behavior multiple times:
   acquiring, from the wireless remote control terminal via the wireless communication, track data generated through the multiple implementations of the pre-stored operation behavior by the user;
   determining, according to the track data generated through the multiple implementations of the pre-stored operation behavior, an action threshold interval for the pre-stored operation behavior; and
   generating second configuration information based on the action threshold interval of the pre-stored operation behavior.

2. The method for configuring a wireless remote control terminal through a third-party terminal according to claim 1, wherein the step of determining in response to an operation behavior setting operation of the user a corresponding relation between an operation behavior and a remote control function comprises:
   acquiring, in response to a new operation behavior inputting operation of the user and via the wireless communication, an operation behavior that the user performs on the wireless remote control terminal, and generating a corresponding relation between the acquired operation behavior and a remote control function.

3. The method for configuring a wireless remote control terminal through a third-party terminal according to claim 2, wherein the step of acquiring via the wireless communication an operation behavior that the user performs on the wireless remote control terminal, and generating a corresponding relation between the acquired operation behavior and a remote control function comprises:
   acquiring, via the wireless communication, a touch operation that the user performs on the smart wearable device, and generating a corresponding relation between the touch operation and a function of turning on or off the remotely controlled device; and
   acquiring, via the wireless communication, a body movement of the user who wears the smart wearable device, and generating a corresponding relation between the body movement and a function of adjusting the remotely controlled device.

4. The method for configuring a wireless remote control terminal through a third-party terminal according to claim 1, wherein the configuration information comprises third configuration information, and after the step of establishing a wireless communication with the wireless remote control terminal, the method further comprises: reading, via the wireless communication, identification information of the wireless remote control terminal and displaying the identification information; and the step of generating, in response to an operation of a user, configuration information for the wireless remote control terminal comprises: carrying out, in response to a permission setting operation of the user, permission setting of the wireless remote control terminal, and generating third configuration information based on the permission setting.

5. The method for configuring a wireless remote control terminal through a third-party terminal according to claim 1, wherein after the step of establishing a wireless communication with the wireless remote control terminal, the method further comprises:

reading, via the wireless communication, a version number of control system software of the wireless remote control terminal;

determining, according to the version number, whether the control system software needs to be updated;

downloading new control system software from an internet server, if the control system software needs to be updated; and sending, via the wireless communication, the downloaded new control system software to the wireless remote control terminal.

6. The method for configuring a wireless remote control terminal through a third-party terminal according to claim 1, wherein the wireless remote control terminal is a smart watch, and the corresponding relation between the operation behavior and the remote control function comprises:

a corresponding relation between an operation behavior of sliding clockwise by X degrees on a dial of the smart watch and a function of turning on a device, wherein X is 90, 108 or 270;

a corresponding relation between an operation behavior of sliding counterclockwise by X degrees on the dial of the smart watch and a function of turning off the device;

a corresponding relation between a spatial action that an arm on which the smart watch is worn moves from left to right, and a function of enabling a television to be switched to a next channel;

a corresponding relation between a spatial action that the arm on which the smart watch is worn moves from right to left, and a function of enabling the television to be switched to a previous channel;

a corresponding relation between a spatial action that the arm on which the smart watch is worn moves to draw a circle, and a function of enabling a television program to be saved; a corresponding relation between a spatial action that the arm on which the smart watch is worn moves from left to right, and a function of enabling a temperature of an air conditioner to be raised;

a corresponding relation between a spatial action that the arm on which the smart watch is worn moves from right to left, and a function of enabling the temperature of the air conditioner to be decreased; and a corresponding relation between a spatial action of the arm on which the smart watch is worn moves to draw a circle, and a function of enabling a mode of the air conditioner to be changed.

7. A wireless remote control method, wherein at side of a wireless remote control terminal, the method comprises: establishing a wireless communication with a third-party terminal; receiving, via the wireless communication, configuration information sent from the third-party terminal; and remotely controlling one or more remotely controlled devices, according to an operation behavior of a user and the configuration information, wherein the wireless remote control terminal is a smart wearable device; the configuration information comprises first configuration information, the first configuration information comprises a corresponding relation among an operation behavior, a remote control function, a remotely controlled device and a remote control instruction, and the step of remotely controlling one or more remotely controlled devices according to an operation behavior of a user and the configuration information comprises: receiving an operation behavior of a user; performing, based on received operation behavior of the user, a matching operation on the first configuration information, so as to match out a remotely controlled device and a remote control instruction, with the matched remotely controlled device and the matched remote control instruction corresponding to the received operation behavior of the user; and sending the matched remote control instruction to the matched remotely controlled device, wherein the configuration information further comprises second configuration information, and the second configuration information is an action threshold interval of the operation behavior, the step of remotely controlling one or more remotely controlled devices according to an operation behavior of a user and the configuration information further comprises: determining, after the operation behavior of the user is received, whether track data corresponding to the received operation behavior of the user is within the action threshold interval; and executing the step of performing, based on received operation behavior of the user, a matching operation on the first configuration information, so as to match out a remotely controlled device and a remote control instruction with the matched remotely controlled device and the matched remote control instruction corresponding to the received operation behavior of the user, if the track data corresponding to the received operation behavior of the user is within the action threshold interval.

8. The wireless remote control method according to claim 7, wherein the configuration information further comprises third configuration information, and the third configuration information comprises information about permission setting, the step of remotely controlling one or more remotely controlled devices according to an operation behavior of a user and the configuration information further comprises:

determining, before the matched remote control instruction is sent to the matched remotely controlled device, whether the remotely controlled device is allowed to be remotely controlled according to the permission setting; and executing the step of sending the matched remote control instruction to the matched remotely controlled device, if the remotely controlled device is allowed to be remotely controlled according to the permission setting.

9. A wireless remote control system, comprising:

a remotely controlled device; and a wireless remote control terminal configured to remotely control one or more remotely controlled devices, wherein the wireless remote control terminal is configured by the method for configuring a wireless remote control terminal through a third-party terminal according to claim 1; and wherein the wireless remote control terminal is a smart wearable device.

* * * * *